H. A. PAINE.
COMPRESS.
APPLICATION FILED FEB. 9, 1918.
1,288,976.
Patented Dec. 24, 1918.
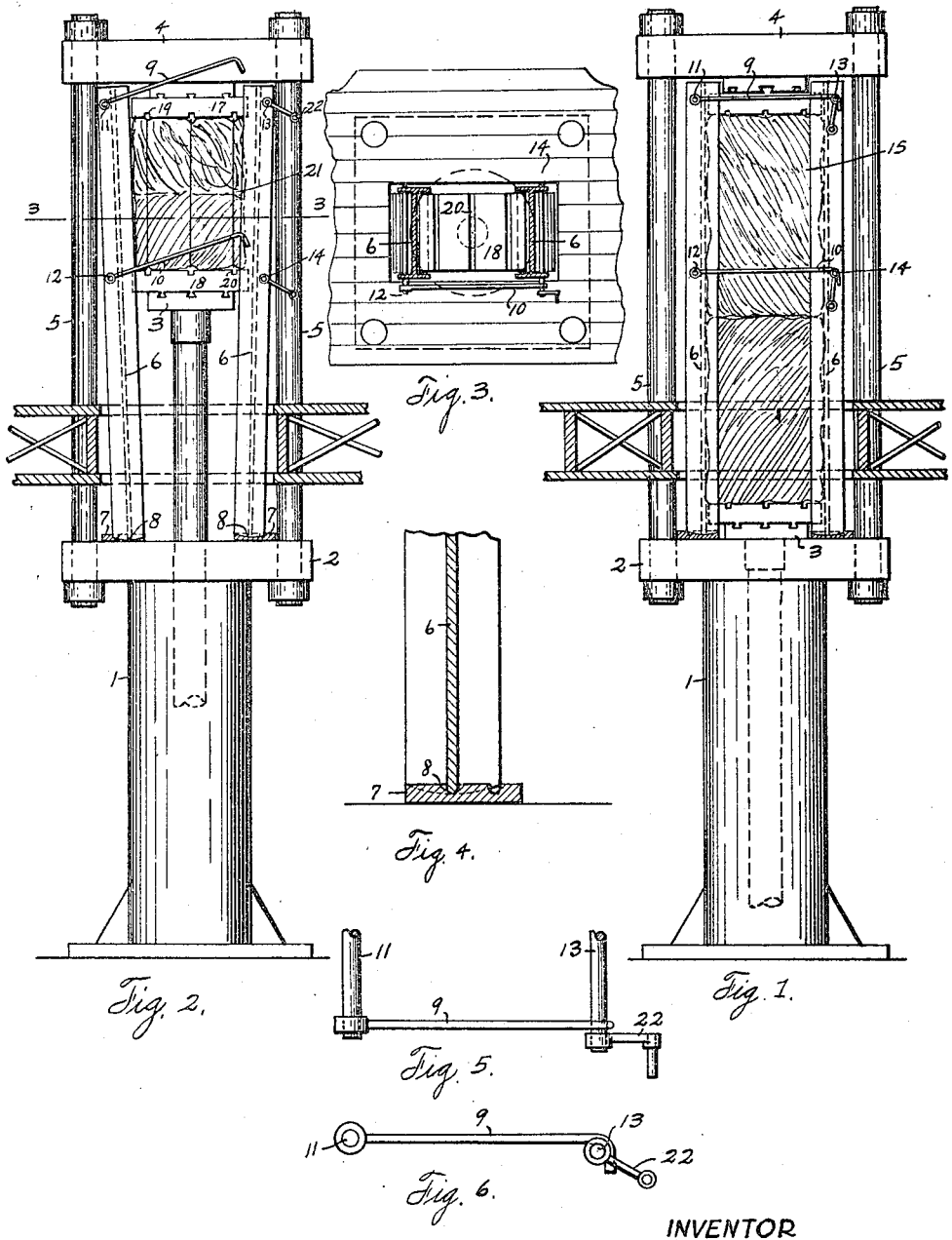
INVENTOR
Herbert A. Paine
BY:
Hardway Carter
ATTORNEYS.

UNITED STATES PATENT OFFICE.

HERBERT A. PAINE, OF HOUSTON, TEXAS.

COMPRESS.

1,288,976.          Specification of Letters Patent.      Patented Dec. 24, 1918.

Application filed February 9, 1918. Serial No. 216,206.

*To all whom it may concern:*

Be it known that I, HERBERT A. PAINE, a citizen of the United States, residing at Houston, in the county of Harris and State of Texas, have invented certain new and useful Improvements in Compresses, of which the following is a specification.

This invention relates to new and useful improvements in a compress, and has more particular relation to a machine of the character described which is particularly adapted for compressing baled hay.

The object of the invention is to provide a compress of the character described adapted to receive a plurality of bales of hay, as formed by the ordinary hay baler, and to compress the same into a compact bale of great density, so as to reduce the volume of hay thereby conducing to economy in shipping.

Another object of this invention is to provide a compress of the character described from which the compressed bale may be readily discharged.

A further feature of the invention resides in the provision of the compress of the character described which is simple and may be cheaply and easily constructed and easily operated, and one which is not liable to get out of repair.

With the above and other objects in view, the invention has particular relation to certain novel features of construction, operation and arrangement of parts, an example of which is given in this specification and illustrated in the accompanying drawings wherein:—

Figure 1, is a side elevation of the compress, partially in section, showing the bales of hay therein, and the machine in position to begin the compression stroke.

Fig. 2, shows a side elevation of the machine, partially in section, showing the compressed bale therein and the machine in position to permit the discharge of said bale.

Fig. 3, shows a transverse sectional view taken on the line 3, 3, of Fig. 2.

Fig. 4, shows a fragmentary vertical sectional view of one side of the compress chamber, and Figs. 5 and 6, show, respectively, plan and side views of the means for locking the chamber walls in fixed position during the compression stroke, and embodying also means for releasing said locking means.

Referring now more particularly to the drawings wherein like numerals of reference designate similar parts in each of the figures, the numeral 1 refers to a hydraulic cylinder whose upper end carries the head 2, and by means of which the hydraulic plunger 3 is operated. A head block 4 is spaced above the cylinder head 2 and is fixed in its relation to said head by means of four columns 5, said columns being spaced a sufficient distance apart to provide suitable space for the compress chamber.

The compress chamber is formed of two oppositely disposed walls 6, 6. These walls are free at their upper ends, but at their lower ends are pivoted to the head 2, so that when the bale has been completed and tied, they may be spread apart to permit the discharge of the bale. These walls are, preferably, formed of channel irons, or of I beams, as shown. The head 2 is provided with anchor blocks 7, 7, arranged on opposite sides of the plunger and provided with transverse bearing notches, as 8, to receive the lower end of the web of the corresponding I beam, and the lower ends of the flanges of said beams fit against the sides of said anchor blocks, as indicated by dotted lines in Fig. 4, so as to prevent a displacement of the chamber walls. As shown in Figs. 2 and 4, the anchor blocks are provided with a plurality of bearing notches 8, providing for the adjustment of the chamber walls, so that the size of the compress chamber may be varied to accommodate different sized bales.

For the purpose of securing the chamber walls against spreading during the compression stroke of the plunger, I have provided two pairs of securing hooks 9, 9, and 10, 10, one pair being arranged at the upper end of the chamber and the other pair being spaced below, as shown in Fig. 2. These hooks are secured at one end to the respective ends of the rods 11 and 12, which have bearings in the outer flanges of one of the chamber walls and their free ends are formed to engage over the outer ends of the corresponding rods 13 and 14, which pass through the outer flanges of the other chamber wall.

When the plunger 3 is withdrawn, the upper ends of the chamber walls are spread apart, as shown in Fig. 2, and the bales 15 and 16 are placed in position in the compress chamber, and the upper ends of the chamber walls are then drawn together, and the hooks 9 and 10 are secured over the corresponding ends of the rods 13 and 14. The plunger is then driven upwardly, and the bales are retained in vertical alinement by the inner flanges of the walls and compressed to the required density, as shown in Fig. 2. The plunger 3 and the head block 4 are each provided with a detachable block as 17 and 18, whose faces have alined transverse grooves as 19 and 20, through which the tying wires 21, may be passed and secured around the bale. One end of each of the rods 13 is provided with a handle 22, by means of which said rods 13 and 14 may be turned backwardly, so as to release the hooks 9 and 10 therefrom. This arrangement is necessary inasmuch as the expansion of the compressed bale against the walls will cause said hooks to securely engage said rods. When the bale has been compressed and tied, the hooks 9 and 10 may be released, as explained, permitting the spreading of the upper ends of the chamber walls, and upon the beginning of the back stroke of the plunger, the compressed bale may be withdrawn from the chamber.

What I claim is:

1. A device of the character including a fixed head, a plunger opposing said head and provided to compress material between said plunger and head, oppositely-arranged side walls each having inwardly extending flanges spaced apart forming a chamber in which said material is compressed, said walls being pivoted at one end and capable of movement toward and from each other at their other ends, and means for securing said last mentioned ends in fixed position while said material is being compressed and permitting the release thereof, so as to permit the discharge of said bale upon the release of the compression stroke of said plunger.

2. In a device of the character described, a compress chamber including a fixed head and side walls formed of channel irons and which are pivoted at one end and whose other ends are capable of lateral movement relative to each other, means for securing said last mentioned ends in fixed relation, and a plunger operating in said chamber opposite said head and provided to compress the material in the chamber against said head.

3. In a device of the character described, a compress chamber including laterally movable side walls having inwardly extending marginal flanges, a fixed head arranged at one end of said chamber, a plunger arranged to operate in the chamber and to compress material between said plunger and head, and means for locking said side walls in fixed position relative to each other.

4. A device of the character described including a fluid pressure cylinder, a plunger operated thereby, a fixed head opposing said plunger, a pair of side walls formed into channels whose ends adjacent the cylinder are pivoted, and whose opposite ends are capable of movement toward and from each other, means for securing said last mentioned ends against relative movement, said side walls, forming with said head, a compress chamber wherein said plunger operates to compress material between the plunger and head.

In testimony whereof I have signed my name to this specification in the presence of two subscribing witnesses.

HERBERT A. PAINE.

Witnesses:
JAS. W. OLIVER,
IRENE BRUNS.

Copies of this patent may be obtained for five cents each, by addressing the "Commissioner of Patents, Washington, D. C."